United States Patent
Dodge et al.

[11] Patent Number: 5,854,787
[45] Date of Patent: Dec. 29, 1998

[54] METHOD FOR REDUCING MESSAGE ERROR RATE WITHIN REAL-TIME EXCHANGE RADIO-FREQUENCY COMMUNICATIONS SYSTEMS

[75] Inventors: Robert D. Dodge, Cedar Rapids; James P. Hubert, Robins; Ricky D. Wash, Cedar Rapids; James A. Minnick, Central City; Scott J. F. Zogg, Cedar Rapids, all of Iowa

[73] Assignee: Rockwell International, Costa Mesa, Calif.

[21] Appl. No.: 766,910

[22] Filed: Dec. 13, 1996

[51] Int. Cl.⁶ ................................................. H04L 12/64
[52] U.S. Cl. ............................................. 370/349; 370/473
[58] Field of Search .................................. 370/310, 328, 370/338, 349, 389, 392, 394, 400, 471, 473, 474, 475

[56] References Cited

U.S. PATENT DOCUMENTS 5,481,532  1/1996  Hassan et al. ............................ 370/312
5,481,539  1/1996  Hershey et al. .......................... 370/349
5,521,925  5/1996  Merakos et al. ........................ 370/95.3
5,526,353  6/1996  Henley et al. ........................... 370/392

*Primary Examiner*—Chi H. Pham
*Assistant Examiner*—Frank Duong
*Attorney, Agent, or Firm*—Kyle Eppele; James P. O'Shaughnessy

[57] ABSTRACT

A method for real-time data exchange between an RF modem of a mobile data terminal and a base station host computer of a mobile radio-frequency data communications network is disclosed. In a preferred embodiment, the data exchange timing architecture of the present invention reduces message error rates by accurately predicting signal presence by using a modem hosted by the central processing unit of a mobile data terminal. RF network signal synchronization is improved through precise prediction of the likelihood of message presence, a method that significantly reduces message errors triggered by inadvertent synchronization on signal noise.

11 Claims, 1 Drawing Sheet

METHOD FOR REDUCING MESSAGE ERROR RATE WITHIN REAL-TIME EXCHANGE RADIO-FREQUENCY COMMUNICATIONS SYSTEMS

BACKGROUND OF THE INVENTION

The present invention relates to mobile radio-frequency data communications systems and more particularly to reduction of message error rates in mobile radio-frequency data communications systems.

There are many applications in which it is desirable to communicate real-time information over a radio-frequency communications link. For example, in remote reporting fleet vehicle applications, it is advantageous to collect up-to-date information in the field which is immediately transferred to a central host station for expedient analysis and utilization of the collected field data. In mass public transit systems, for example, passenger load and travel patterns may be collected and analyzed to provide efficient routing and timing of the mass transit vehicles to the desired destinations. The host system may compute the most efficient path in terms of moving the greatest number of passengers to the greatest number of sites on the transit route in the least amount of time. Such computations may be carried out for multiple vehicles simultaneously and inclusively for all utilized routes. Other similar applications may be contemplated as well, for example product delivery fleets in which delivery vehicles may be efficiently routed between delivery and warehouse destinations.

Typically, the information may be collected in the field and entered into a mobile data terminal which communicates with the host station over a radio-frequency network. A radio-frequency modem is utilized to provide an interface between the mobile data terminal and the radio-frequency communication network. It is desirable to achieve RF network signal synchronization and avoid inadvertent synchronization onto noise signals. Inadvertent noise synchronization can be especially troublesome in densely populated urban environment since unlicensed radio-frequency networks typically utilize the same frequency bands as mobile and cellular phones, pagers, etc.

It is therefore an object of the invention to provide improved RF network signal synchronization in a mobile radio-frequency communications system.

It is another object of the present invention to provide precise prediction of the likelihood message presence in a mobile radio-frequency communications network.

It is yet a further object of the invention to provide reduced message errors in a mobile radio-frequency communication network triggered by inadvertent synchronization on noise signals.

SUMMARY OF THE INVENTION

The present invention provides improved real-time data exchange between an RF modem of a mobile data terminal and a base station host computer of a mobile radio-frequency data communications network. In a preferred embodiment, the data exchange timing architecture of the present invention reduces message error rates by accurately predicting signal presence by using a modem hosted by the central processing unit (CPU) of the mobile data terminal. The invention improves RF network signal synchronization through precise prediction of the likelihood of message presence, a method that significantly reduces message errors triggered by inadvertent synchronization on signal noise.

The data exchange timing architecture provides a robust method of reducing message errors and improving RF network efficiency, a critical issue in accommodating message exchange within large fleets of reporting vehicles. Utilization of a modem hosted by an on-vehicle CPU of a mobile data terminal instead of a modem linked to an on-board radio provides rapid capture of message presence and greatly reduces delays and message errors linked to system timing variations inherent in current art technologies.

DESCRIPTION OF THE PREFERRED EMBODIMENT

Figure 1:
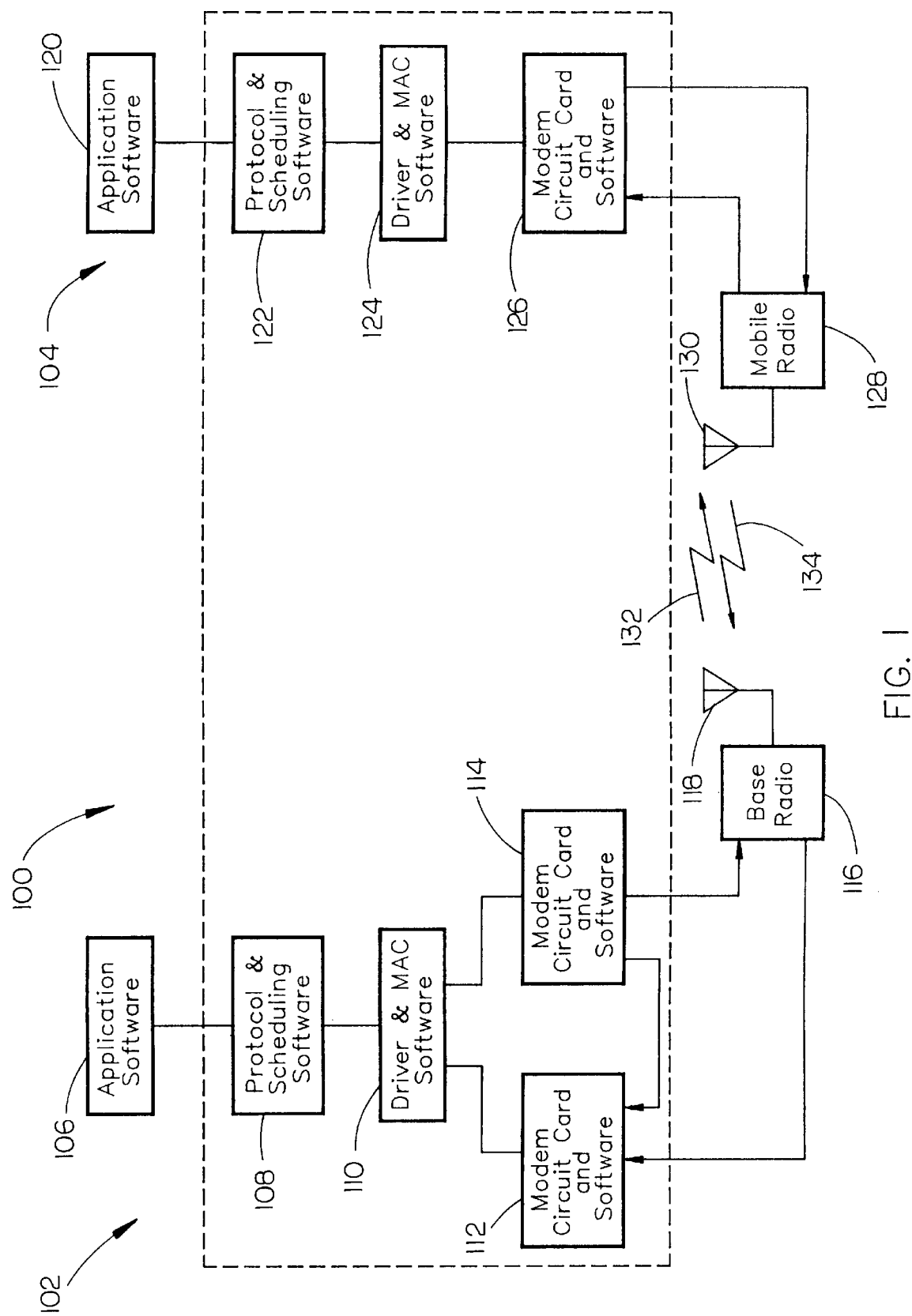
FIG. 1 shows a functional block diagram of the real-time exchange radio-frequency communication system in accordance with the present invention.

Referring now to FIG. 1, a functional block diagram of a real-time exchange radio-frequency communications network in accordance with the present invention is shown. The communications network 100 comprises a base station system 102 and a remote system 104 of one or more mobile data terminals. The base station system is controlled by application software ("Application Software") 106, protocol and scheduling software ("Protocol & Scheduling Software") 108, and driver and media access control software ("Driver & MAC Software") 110. The driver and MAC software control both the modem circuit card and modem software ("Modem Circuit Card and Software") 112, 114 which communicate with the base station radio ("Base Radio") 116 which includes antenna 118 for transmission and reception of RF data communications signals.

The remote system 104 similarly is controlled by application software ("Application Software") 120, protocol and scheduling software ("Protocol & Scheduling Software") 122, and driver and media access control software ("Driver & MAC Software") 124. The driver and MAC software control both the modem circuit card and modem software ("Modem Circuit Card and Software") 126 which communicate with mobile system radio ("Mobile Radio") 128 which includes antenna 130 for transmission and reception of RF data communications signals. Data is transferred from the base station system 102 to the remote system 104 via down link 132, and data is transferred from the remote system 104 to the base station system 102 via up link 134.

The modem card software may be referred to as the modem card firmware. The task of the firmware is to support the modem card. The modem card may be installed into the remote system data terminal 104. The modem card and software 126 operate as the interface between the mobile data terminal of remote system 104 and mobile radio 126. The mobile data terminal 104 may utilize DOS based or compatible PC architecture. Alternatively, the remote system 104 may comprise any type of compatible computer device, PC or otherwise. The base radio 128 may be integrated with the mobile data terminal 104 and may be used for transmitting both wireless data and voice signals.

The overall task of the modem card firmware is to pass data to and from the radio and to and from the main processor of the remote system device 104. When the remote system 104 is powered up the firmware first initializes and resets all hardware functions and then issues a modem reset message to the main processor of the remote system 104. When the modem card 126 receives data in the form of a message over the communications network 100, the modem places the message into a buffer for storing received data which may be a dual-port buffer. The modem card 126 subsequently generates an interrupt sent to the main processor of the remote system 104.

A message may be defined as comprising the modem card's message header and packet block. A message header contains information to indicate message type. A frame header is in the transmission and reception protocol and may be 6 bytes in size. The packet comprises the actual data to be transmitted or received and may be 18 bytes in size.

Subsequent to performing power-up functions, the firmware performs a self-test on hardware functions, and then waits until the network data is loaded and an interrupt is received. While the firmware is waiting to receive an interrupt, the firmware will pulse the interrupt line to the main processor which is typically the only time the modem card will pulse the main processor interrupt line.

For data transmission over the network 100, the main processor of the remote system 104 indicates to the modem card when to send a message to be transmitted to radio 128. The message transmittal time for a message to be transmitted is defined by a variable having a value 0 to 59,999 in units of milliseconds.

For data transmission, the main processor will communicate with the modem 126 to write a message which will contain a transaction type into a buffer for storing transmission data and then generate and send an interrupt to the modem card 126 by writing to an interrupt location.

The main processor sends the modem card 126 a message which includes information as to the type, millisecond time, number of packets, and packet data for the message. The modem card then transmits the packets using the following routine.

The main processor sends a message to be transmitted from a main processor to the modem card. The radio key time, message transmittal time, and radio unkey time are calculated in milliseconds. The firmware then verifies whether the modem is in the process of receiving a message. If the modem is receiving a message then the radio keying time, the message transmitting time and the radio unkeying time are recalculated until the modem is not receiving a message.

At the key radio millisecond time, the radio will be keyed. At the message transmittal millisecond time, the frame header will be transmitted. The number of packets to be transmitted are inserted onto the control data of the frame header's. Packets are serially transmitted until all packet have been transmitted, up to the maximum allowable number of packets. A hang byte is then transmitted subsequent to transmission of all packets. At the unkey radio millisecond time, the radio will be unkeyed. After transmission of a message is complete the remote system 104 reverts to back into message receive mode.

For data reception, the modem card will write a message containing a transaction type into buffer for storing received data and then generate and send an interrupt to the main processor. The modem card will verify the validity of the received message and, after receiving valid data, the modem card will generate and send an interrupt to the main processor.

The modem receives and reads a frame header from a potential message. The number of packets in the message is then read from the control data of the frame header. The message is verified as a valid message by comparing the frame header information to a status register which indicates the protocol for data transmission (e.g., frame header size, packet size, etc.). If the message cannot be verified from the frame header control data as a valid message, then the message is ignored. Otherwise, the received packets are converted into a message. A modem header is then built and moved to a buffer for storing received data which is preferably a dual-port buffer. Each packet is received serially and moved to the buffer until all of the packets in the message have been received. After the complete message is received, an interrupt is generated and sent to the main processor of the system to thereby indicate that there is a new message in the buffer.

The radio-frequency communications system of the present invention may be designed having the latency advantages of immediate message acknowledgment without the penalty of having a lot of overhead acknowledgment messages. Such advantages may be achieved by utilization of a set of protocols which allows messages to be retransmitted without the use of timers. Current state of the art mobile communications systems rely upon timers to achieve message acknowledgment wherein a timer is set when a message is transmitted. If the timer expires before the an acknowledgment of a sent message is received by the transmitting unit from the receiving unit, it is assumed that the message was not correctly received, and the message is then retransmitted. In order for such an approach to be successful, timers must be set fairly long to avoid unnecessary resending of messages. However, longer acknowledgment timers increases overall transmission times, especially for messages that must be repeated. State of the art systems have attempted to solve the delay problem by allowing for acknowledgments following each transmission or set of transmission. This approach solves the latency problem but at a penalty that the acknowledgment messages occupy valuable network bandwidth. As a result of lower network bandwidth, the number of participants which a given network is capable of supporting is diminished.

The present invention utilizes a predefined priority based message transmission acknowledgment scheme in which messages are acknowledged by a predetermined number of bits in the message header. Extra transmissions are required only in the absence of user information to be sent on the network. Thus, the present invention achieves the latency advantages of immediate acknowledgment without the penalty of overhead acknowledgment messages.

All messages between the base terminal and the mobile terminal are assigned a priority. The base terminal polls the mobile terminals at a specific period depending upon the state of the mobile terminal. Additionally, the base terminal may provide slots for the mobile terminals to initiate transmissions on a random access basis when required. When the base terminal has information to send to a mobile terminal, the base terminal will assign a slot in the future for that terminal to reply. The polling interval for this mobile terminal is adjusted so that the assigned slot will count as of the mobile terminal's polling slots. When the mobile terminal replies to the base terminal, the mobile terminal will send any information existing in its queues highest priority first and will acknowledge or negatively acknowledge the transmission from the base station.

When a remote mobile terminal has information to transmit to a base terminal, the mobile terminal will wait for either its next polled slot or, if the message priority rules allow, the terminal will access a random access slot. After transmissions of the slot the remote terminal will monitor the transmissions from the base terminal. If the base terminal sends information at a lower priority than the priority at which the remote terminal sent the original message without acknowledging the message, the remote terminal will consider this to be a negative acknowledgment and queue the message for retransmission. Thus, the remote terminal does not need to wait for a timer to expire before retransmission, and the base terminal does not waste bandwidth with a negative acknowledgment transmission.

The radio-frequency communications network of the present invention may further implement message scheduling software in the base station. The algorithm implemented by the software utilizes information in the application level data stream to determine the polling period for a particular terminal. This architecture allows more bandwidth to be allocated to remote terminals requiring more bandwidth and allows less bandwidth to be allocated to remote terminals requiring less bandwidth. In a preferred embodiment of the present invention, the position/velocity information being provided by the various remote mobile terminals is utilized to provide a higher polling rate to those terminals moving rapidly and a lower polling rate to those terminals moving slowly. The present invention further provides higher polling rates to systems that are in an emergency state. The state of the art wherein application level data is hidden from the polling software teaches away from this approach. Application specific information must be integrated within the polling software, however the more efficient utilization of bandwidth is thereby achieved.

It is believed that the method for reducing message error rate in real-time exchange radio-frequency data communications systems of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for receiving data within a real-time data exchange radio-frequency communications network, comprising:

receiving a potential message including a frame header having frame header control data with a radio-frequency modem;

reading the number of packets of the potential message from the control data of the received frame header;

verifying the message by comparing the frame header to message format information indicated by a status register;

ignoring the message if the status cannot be verified;

otherwise, converting the packets into a message by performing the steps of: building a modem header and moving the modem header to a buffer for storage of received data;

reading a packet from the radio-frequency modem; moving the read packet to the buffer;

repeating said packet reading step and said packet moving step until all packets have been read and moved into the buffer; and thereafter, sending an interrupt signal to a main processor thereby indicating the presence of a new message in the buffer.

2. A method for receiving data according to claim 1, wherein the buffer is a dual-port buffer.

3. A method for receiving data according to claim 1, wherein said verifying step includes the step of verifying the packet status.

4. A method for receiving data according to claim 1, further comprising the step of continually receiving potential messages while the radio-frequency modem is in a message receive mode.

5. A method for receiving data according to claim 4, further comprising the step of setting the radio-frequency modem into a message transmit mode upon the radio-frequency modem receiving a message to be transmitted.

6. A method for receiving data according to claim 5, further comprising the step of transmitting the message to be transmitted after said step of setting the radio-frequency modem into a message transmit mode.

7. A method for receiving data according to claim 6, further comprising the step of resetting the radio-frequency modem to after said transmitting step.

8. A method for transmitting data within a real-time data exchange radio-frequency communications network, comprising:

sending a message to be transmitted from a main processor to a radio-frequency modem;

calculating the time at which to key a radio for transmitting the message, the time at which to transmit the message, and the time at which to unkey the radio;

verifying whether the radio-frequency modem is receiving a message;

recalculating the radio keying time, the message transmitting time and the radio unkeying time if the radio-frequency modem is receiving a message and repeating said verifying step until the radio-frequency modem is not receiving a message;

upon the radio-frequency modem not receiving the message, keying the radio at the calculated radio keying time;

inserting the number of packets to be transmitted onto the control data of a frame header and then transmitting the frame header at the calculated message transmitting time;

transmitting each packet until all packets have been transmitted; and unkeying the radio at the radio unkeying time.

9. A method for transmitting data according to claim 8, further comprising the step of transmitting a hang byte after said packet transmitting step.

10. A method for transmitting data according to claim 8, further comprising the step of setting the radio-frequency modem into a message receive mode after said radio unkeying step.

11. A method for transmitting data according to claim 8, further comprising the step of sending an interrupt signal to the radio-frequency modem thereby indicating the termination of data transmission.

* * * * *